United States Patent
Klemt et al.

(10) Patent No.: US 10,882,993 B2
(45) Date of Patent: Jan. 5, 2021

(54) POLYMER COMPOSITION, FIBRE-COMPOSITE SEMI-FINISHED PRODUCT AND METHOD FOR THE PRODUCTION THEREOF

(71) Applicants: VOLKSWAGEN AKTIENGESELLSCHAFT, Wolfsburg (DE); EVONIK DEGUSSA GMBH, Essen (DE)

(72) Inventors: Christian Klemt, Lehrte (DE); René Hunger, Isenbuttel (DE); Kathrin Lehmann, Leverkusen (DE)

(73) Assignees: VOLKSWAGEN AKTIENGESELLSCHAFT, Wolfsburg (DE); EVONIK DEGUSSA GMBH, Essen (DE)

( * ) Notice: Subject to any disclaimer, the term of this patent is extended or adjusted under 35 U.S.C. 154(b) by 0 days.

(21) Appl. No.: 15/300,750

(22) PCT Filed: Mar. 26, 2015

(86) PCT No.: PCT/EP2015/056543
§ 371 (c)(1),
(2) Date: Sep. 29, 2016

(87) PCT Pub. No.: WO2015/150214
PCT Pub. Date: Oct. 8, 2015

(65) Prior Publication Data
US 2017/0015826 A1    Jan. 19, 2017

(30) Foreign Application Priority Data
Mar. 31, 2014   (DE) .................. 10 2014 104 513

(51) Int. Cl.
*C08L 77/02*   (2006.01)
*C08J 5/18*   (2006.01)
(Continued)

(52) U.S. Cl.
CPC .......... *C08L 77/02* (2013.01); *B29C 70/465* (2013.01); *B29C 70/506* (2013.01); *C08J 3/22* (2013.01);
(Continued)

(58) Field of Classification Search
CPC ...... C08L 77/02; C08J 3/22; C08J 5/18; C08J 5/04
(Continued)

(56) References Cited

U.S. PATENT DOCUMENTS 6,231,922 B1   5/2001   Kline
2002/0091205 A1*  7/2002   Brewer .................. C08L 83/00
525/431

(Continued)

FOREIGN PATENT DOCUMENTS

CN   1429253 A   7/2003
DE   4003621 C1   12/1990
(Continued)

OTHER PUBLICATIONS

Yilgor, Emel; Surface properties of polyamides modified with reactive polydimethylsiloxane oligomers and copolymers; Sep. 24, 2003; Science Direct; whole document.*
(Continued)

*Primary Examiner* — Tahseen Khan
(74) *Attorney, Agent, or Firm* — Pearl Cohen Zedek Latzer Baratz LLP

(57) ABSTRACT

The invention relates to a polymer composition and a fiber-composite semi-finished product, the surface thereof being at least partially formed from the polymer composition. The invention also relates to an associated production method for the fiber-composite semi-finished product. Said polymer composition is characterized in that it contains 100
(Continued)

parts by weight of a polyamide and 0.5-20 parts by weight of one or more adhesion-promoting additives.

18 Claims, 2 Drawing Sheets

(51) Int. Cl.
 *C08J 5/04* (2006.01)
 *C08L 77/06* (2006.01)
 *B29C 70/50* (2006.01)
 *B29C 70/46* (2006.01)
 *C08J 3/22* (2006.01)

(52) U.S. Cl.
 CPC . *C08J 5/04* (2013.01); *C08J 5/18* (2013.01); *C08L 77/06* (2013.01); *C08J 2377/00* (2013.01); *C08J 2377/02* (2013.01); *C08L 2203/16* (2013.01); *C08L 2310/00* (2013.01)

(58) Field of Classification Search
 USPC .......................................................... 428/220
 See application file for complete search history.

(56) References Cited

U.S. PATENT DOCUMENTS

| | | | | |
|---|---|---|---|---|
| 2004/0014888 | A1* | 1/2004 | Fournier | C08L 83/04 525/100 |
| 2008/0318058 | A1* | 12/2008 | Sherman | C09J 183/12 428/423.1 |
| 2010/0215920 | A1* | 8/2010 | Orange | B29C 45/0001 428/195.1 |
| 2013/0319522 | A1* | 12/2013 | Koike | H01L 31/02366 136/256 |
| 2013/0344325 | A1 | 12/2013 | Nguyen et al. | |
| 2014/0256864 | A1* | 9/2014 | Isago | C08J 3/203 524/400 |
| 2014/0296414 | A1* | 10/2014 | Hattori | C08K 3/22 524/495 |
| 2015/0057199 | A1 | 2/2015 | Yamasaki et al. | |
| 2015/0225557 | A1* | 8/2015 | Habimana | C08L 23/12 523/351 |
| 2016/0319211 | A1* | 11/2016 | Barth | C08G 59/22 |
| 2017/0058114 | A1* | 3/2017 | Arrigoni | C08L 23/12 |

FOREIGN PATENT DOCUMENTS

| | | |
|---|---|---|
| DE | 4104692 A1 | 8/1992 |
| DE | 4113417 A1 | 10/1992 |
| DE | 69115428 T2 | 5/1996 |
| DE | 19943666 A1 | 3/2001 |
| DE | 19959412 A1 | 6/2001 |
| DE | 10204893 A1 | 8/2003 |
| DE | 10338478 A1 | 3/2005 |
| DE | 10 2005 002 960 A1 | 8/2006 |
| EP | 1439200 A1 | 7/2004 |
| EP | 1520870 A1 | 4/2005 |
| EP | 2435246 B1 | 12/2012 |
| JP | 2003-147219 A | 5/2003 |
| JP | 2004-504468 A | 2/2004 |
| JP | 2005-231151 A | 9/2005 |
| JP | 2010-538098 A | 12/2010 |
| JP | 2013-091737 A | 5/2013 |
| JP | 2013091737 A * | 5/2013 |
| JP | 2013-234219 A | 11/2013 |
| JP | 2014-506845 A | 3/2014 |
| RU | 2441098 C2 | 1/2012 |
| RU | 2473552 C2 | 1/2013 |
| SU | 1458365 A1 | 2/1989 |
| TW | 201326306 A | 7/2013 |
| WO | WO-2013046682 A1 * | 4/2013 |
| WO | WO-2013061821 A1 * | 5/2013 |
| WO | WO 2013/168453 A1 | 11/2013 |

OTHER PUBLICATIONS

Machine_English_translation_JP_2013091737_A; Kitajima, T.; May 16, 2013; EPO; whole document (Year: 2013).*
"Reactive & Non-Reactive modified Silicone Fluid Reactive Silicone Fluids 2-6 Non-Reactive Silicone Fluids 7-9 Storage & Handling Precautions 9", Shin-Etsu Silicones, Modified Fluids Brochure, Jul. 2006.
"Silicones for Resin Modification", Silicone Review, Shin-Etsu Silicones, Jan. 2011.
Search Report for PCT International Patent Appl. No. PCT/EP2015/056543, dated Jun. 22, 2015.
Office Action for Russian Patent Application No. 2016141467/05, dated Sep. 28, 2018.
Office Action for Chinese Patent Application No. 201580017684.9, dated Oct. 8, 2018.
Office Action for Japanese Patent Application No. 2016-560562, dated Dec. 5, 2018.
Office Action for Taiwanese Patent Application No. 10410989, dated Jun. 24, 2019.

* cited by examiner

POLYMER COMPOSITION, FIBRE-COMPOSITE SEMI-FINISHED PRODUCT AND METHOD FOR THE PRODUCTION THEREOF

CROSS-REFERENCE TO RELATED APPLICATIONS

This application is a National Phase Application of PCT International Application No. PCT/EP2015/056543, International Filing Date Mar. 26, 2015, claiming priority of German Patent Application No. 10 2014 104 513.0, filed Mar. 31, 2014, which is hereby incorporated by reference in its entirety.

FIELD OF THE INVENTION

The invention relates to a polymer composition and a semi-finished fiber composite product with a surface formed at least partially from the polymer composition. The invention further relates to a corresponding method of producing the semi-finished fiber composite product.

BACKGROUND OF THE INVENTION

Fiber composite materials are nowadays used in many fields of technology to enhance the properties of components and, in particular, to reduce their weight. Such fiber composite materials have at least two main components, namely a matrix and fibers embedded in said matrix which serve as reinforcement. For the purposes of the present invention, only fiber composite materials with a polymer matrix are of interest. The combination of such fiber composite materials with further materials, in particular metals, is used as an approach to developing new lightweight construction technologies in particular in motor vehicle construction. This presents the particular problem of binding the fiber composite material to the metal in a sufficient way. The production of a plastic-metal hybrid component from a metallic base body and a semi-finished fiber composite product that is connected to the base body and made of a fiber composite material with a polymer matrix thus requires the development of specific joining technologies.

Established joining technologies include, for example, the mechanical joining of the semi-finished fiber composite product to the metallic component by means of rivets, by collar joining or by bolt-setting. Furthermore, the semi-finished fiber composite product can be joined to the metallic component by an adhesion process. Traditional adhesion processes, however, have the disadvantage that additional processing steps are required to apply an adhesive and to cure it, thus making automation more complicated. Moreover, the material properties of the adhesive must be such that it develops a sufficiently strong adhesive force both to the semi-finished fiber composite product and the metallic component. Apart from that, the other mechanical properties of the adhesive should also be such that the advantages of the composite are actually reflected in its behavior. Special hot-melt adhesives that facilitate a binding of metals to polymers have been developed in the meantime. For example, EP 2 435 246 B1 describes such a hot-melt adhesive which is copolyamide-based and facilitates a substance-to-substance bond with the metallic surface via isocyanate and epoxide functionalities. Nevertheless, the known joining technologies with substance-to-substance bonding facilitated by adhesives exhibit the above-mentioned disadvantages in the process sequence which counteract increased automation. In particular, no adhesion promoters for process-integrated joining in press processes that are suitable for binding polymer materials to metals are known.

SUMMARY OF THE INVENTION

One or more of the disadvantages known from the prior art which were described above can be overcome or at least alleviated with the help of the polymer composition in accordance with the present invention. For this purpose, the polymer composition contains
a) 100 parts by weight of a polyamide;
b) 0.5 to 20 parts by weight of one or more adhesion-promoting additives of Formula (I):

$$M_a M'_b D_c D'_d \qquad (I)$$

with
$M = [R_3 SiO_{1/2}]$
$M' = [R'R_2 SiO_{1/2}]$
$D = [R_2 SiO_{2/2}]$
$D' = [R'RSiO_{2/2}]$
wherein each R independently stands for methyl or phenyl and R' is a glycidyloxypropyl radical of Formula (II)

and wherein the following holds true for the indices:
a=0 to 2
b=0 to 2
c=10 to 500
d=0 to 50
a+b=2 and
b+d≥2.

The polymer composition accordingly contains at least two components, namely a polyamide and an additive (or a mixture of additives) introduced into the polyamide which, when the polymer composition is subsequently used for its purpose, facilitates a substance-to-substance bonding to the surface of a metal component via its reactive epoxide group. This adhesion-promoting additive—a functionalized polysiloxane—can be worked into the polyamide base without any problems and by using established procedures. In practical application, the additive functions as an adhesion promoter. In doing this, it only marginally changes the mechanical, thermal and rheological properties of the polyamide.

If the additive concentration is too low, the adhesive effect is no longer sufficient. Additive concentrations which are too high, on the other hand, have a negative impact on the mechanical, thermal and rheological properties of the polymer (viscosity increases, thermal expansion coefficient increases, self-crosslinking of the additive, agglomerate formation). Particularly preferably, the polymer composition contains 0.3 to 10 parts by weight, in particular 0.5 to 5 parts by weight, of the adhesion-promoting additive.

According to a preferred variant, R stands for methyl. On the one hand, this results in a cost advantage in production; on the other hand, the processing of the additive with the polyamide is simplified due to the reduced melting and glass transition temperatures in comparison to phenyl-substituting additives.

It is further preferred that a ratio (a+c)/(b+d) of the sum of the indices a+c to the sum of the indices b+d ranges from 2 to 50, in particular from 4 to 20 and particularly preferably from 5 to 15. The given ratio of the unfunctionalized siloxane units, meaning the polysiloxane units having methyl or phenyl radicals, to the polysiloxane units carrying the glycidyloxypropyl radical of Formula (II) has proven to be particularly suitable in the production of plastic-metal hybrid components. A too small fraction of the radical of Formula (II) leads to insufficient substance-to-substance bonding to the surface of the metallic base body. A too large fraction, on the other hand, complicates the processing of the additive into the polymer composition and makes the synthesis of these additives much more complex.

It is further preferred that it holds true for index c that c=15 to 100, in particular c=20 to 50. In the case that b=2, it preferably holds true for index d that d=0 to 20, in particular d=1 to 10. In the case that b=0, it preferably holds true for index d that d=2 to 20, in particular d=3 to 10. With the aforementioned specifications it is possible to optimize the properties of the additive with respect to the polyamide matrix and the subsequent further processing of the polymer composition, for example into a film.

The glycidyloxypropyl radicals of Formula (II) can be present in the additive of Formula (I) in a statistically distributed manner. Statistical distributions have a block-wise construction with any number of blocks following one another in any sequence, or they may have a randomized distribution; they may also have an alternating construction or else form a gradient along the chain of the polymer; in particular, they may also form any mixed form in which groups having different distributions may follow one another. Special embodiments can require that the statistical distributions are restricted by the embodiment. In all areas not affected by the restriction, the statistical distribution remains unchanged.

Polyether-modified siloxanes as adhesion-promoting additives of Formula (I) can be produced by noble metal catalyzed hydrosilylation of allyl glycidyl ether (1-allyloxy-2,3-epoxypropane; CAS Number 106-92-3) with hydrosiloxanes of Formula (III)

$$M_a M'_b D_c D'_d \qquad (III)$$

with
$M=[R_3SiO_{1/2}]$
$M'=[HR_2SiO_{1/2}]$
$D=[R_2SiO_{2/2}]$
$D'=[HRSiO_{2/2}]$ wherein each R independently stands for methyl or phenyl and wherein the following holds true for the indices:
a=0 to 2
b=0 to 2
c=10 to 500
d=0 to 50
a+b=2 and
b+d≥2, as described, for example, in Example 4 of EP 1 520 870 A1.

The hydrosiloxanes of Formula (III) used in the production of the polyether-modified siloxanes can in turn be produced as described in the prior art, for example in EP 1 439 200 A1.

The polyamide of the polymer composition in accordance with the present invention is preferably selected from the group comprising polyamide 6 (PA6), polyamide 12 (PA12) and polyamide 6,6 (PA6,6). In particular, the polyamide is polyamide 6. The adhesion-promoting additive has been developed specifically for use in polyamides. The additive can be excellently processed with polyamides, in particular polyamide 6, without leading to demixing or unwanted reactions between additive and polymer. The adhesion-promoting additives preferably have a migratory ability in the polymer matrix based on polyamide.

The polymer composition may contain other supplements apart from the polyamide and the adhesion-promoting additive. These additional additives can serve, for example, to improve the processing characteristics of the polymer composition, to provide special colors or to adjust other material properties. Preferably, the polymer composition contains cumulatively 0 to 100 parts by weight, in particular 0 to 20 parts by weight of such additional additives. The compositions in accordance with the present invention preferably contain no dimension-stabilizing fibers.

Preferably, the compositions in accordance with the present invention include at least 50% by weight, preferably at least 60% by weight, 70% by weight, 80% by weight, 90% by weight, 95% by weight and in particular at least 99.999% by weight of a mixture of polyamide with an adhesion-promoting additive of Formula (I), wherein the proportion of the adhesion-promoting additive is preferably 0.5 to 5% by weight and particularly preferably 1 to 3% by weight in relation to the overall composition.

The polymer composition is produced from the individual components preferably by melt-mixing in a kneading unit. The adhesion-promoting additive and, if applicable, the additional supplements can be added directly to the polyamide granules or the polyamide melt either individually or together as a mixture. Optionally, the polymer composition will be created from the individual components immediately before further processing, for example in an extruder of a film producing installation. The components can also be added as a mixture in the form of a masterbatch.

The adhesion-promoting additives used, which generally have a viscosity between 10 and 10,000 mPas, can be either added to the polyamide during the production of the polymer composition via liquid dosing, or they can be supplied in solid form as a masterbatch. The latter form is preferred because the processing of liquid components in extruders, especially at concentrations higher than 10%, is technically very complex.

Different methods can be used for producing films made of the polymer composition in accordance with the present invention:

In casting processes, the polymer composition is liquefied in an extruder (usually a single-screw extruder) and cast via a flat-sheet die onto a rotating water-cooled roller, thereby facilitating the production of films with layer thicknesses of 10 to 600 μm at high production speeds.

In the blown film process, the extrudate is also liquefied in the extruder (usually a single-screw extruder) and the polymer composition then passes with the aid of an air flow through a ring-shaped vertical nozzle to form a molten tube which is then cooled down by the air flow. The layer thicknesses are usually between 10 and 500 μm.

The films in accordance with the present invention have a thickness ranging from 10 μm to 600 μm, preferably from 15 μm to 500 μm, more preferably from 20 μm to 400 μm, even more preferably from 30 μm to 300 μm, still more preferably from 50 μm to 200 μm and particularly preferably from 75 to 150 μm. The thickness of the films can be determined in accordance with the state of the art by way of different methods, for example by mechanical means using micrometer screws or by optical means using interference measurements. Preferably, the thickness of the films in accordance with the present invention is determined using micrometer screws, preferably micrometer screws of the Mitutoyo company, particularly preferably those of the outside micrometer type, in particular preferably with a clamping force of the screw ranging from 7 to 9 Newton. With the claimed clamping force, damage to the film can be ruled out, thus ensuring a high level of reproducibility of the measurement values.

Films in accordance with the present invention preferably have accumulation zones of the adhesion-promoting additives of Formula (I) at the boundary layer. In other words, both sides of the film have at its boundary layer a zone (or layer) in which the adhesion-promoting additive of Formula (I) is accumulated.

The concentration of the adhesion-promoting additives in the accumulation zones (3a) is therefore higher than in the bulk (3b) of the film, as is schematically illustrated in FIG. 3. The determination of such accumulation zones is performed using x-ray photoelectron spectroscopy (XPS). This method facilitates an element-dependent concentration measurement in surface layers. It results in a concentration-depth profile of the element silicon, as illustrated in FIG. 4. Films with accumulation zones are particularly advantageous because they allow to lower the concentration of the adhesion-promoting additive, said adhesion-promoting additive being a cost-driving component of the film.

Preferably, the concentration of the adhesion-promoting additives in the accumulation zones is at least 3 times, preferably at least 4 times, more preferably at least 5 times, even more preferably at least 6 times, still more preferably at least 7 times, 8 times, 9 times and in particular at least 10 times higher than in the bulk.

Preferably, the films in accordance with the present invention have accumulation zones with a layer thickness ranging from 0.1 to 4000 nm, preferably from 0.5 to 400 nm, more preferably from 1 to 100 nm, even more preferably from 2 to 50 nm, particularly preferably from 2.5 to 20 nm and in particular preferably from 3 to 10 nm.

Particularly preferred are films with a thickness of the accumulation zone ranging from 2 to 20 nm and with an accumulation concentration that is at least 5 times higher than the bulk concentration.

The films in accordance with the present invention do not necessarily need to be clear; rather, it is possible for them to appear turbid or opaque. These optical characteristics are no quality factors.

Preferably, the film and in particular the accumulation zones of the film do not contain any dimension-stabilizing fibers.

Using the two foregoing methods, it is also possible to manufacture multilayer films. Here at least one of the outer layers of the multilayer film consists of the polymer composition in accordance with the present invention. It is therefore possible, for example, to engineer layer thickness formations in the following manner:

1st layer=polymer composition in accordance with the present invention consisting of a polyamide and at least one adhesion-promoting additive 2nd layer=polyamide without adhesion-promoting additive 3rd layer=polymer composition in accordance with the present invention consisting of a polyamide and at least one adhesion-promoting additive A semi-finished fiber composite product can be made from the additive-enhanced polyamide of the polymer composition in accordance with the present invention using methods known in the art (for example, melt impregnation, film impregnation or powder impregnation in the double-belt pressing process, interval hot pressing).

The semi-finished fiber composite product thus produced consists at least of one layer of the composition in accordance with the present invention and one layer containing dimension-stabilizing fibers. Dimension-stabilizing fibers are single fibers or fiber composites which can be processed into woven fabrics or layers of different fiber orientation; this can be achieved, for example, by winding single fibers or fiber strands such as fiber bundles. The dimension-stabilizing fibers are preferably plastic fibers, carbon fibers or glass fibers, particularly preferably glass fibers.

The fibers are embedded in polyamide, preferably in PA6, PA 6,6 or PA 12, particularly preferably in PA6.

A further aspect of the present invention relates to a semi-finished fiber composite product based on polyamides, wherein at least a part of the surface of the semi-finished product is formed from the polymer composition that has been described above. The semi-finished fiber composite product in accordance with the present invention is therefore characterized by a surface that consists, at least in sections, of the polymer composition.

In this context, it is sufficient if the semi-finished product is coated with the additive-enhanced polyamide only at those surface areas which are meant to create a substance-to-substance bond with a metallic component. The additive is therefore neither required to be present in the whole volume of the semi-finished fiber composite product nor in the whole region close to the surface.

Particularly preferred are semi-finished fiber composite products in accordance with the present invention which consist of a film in accordance with the present invention and one layer of fiber-reinforced polyamide. More preferred are semi-finished fiber composite products in which the layer of fiber-reinforced polyamide has a thickness ranging from 0.5 to 10 mm, preferably from 0.7 to 7 mm, more preferably from 1.0 to 5 mm, even more preferably from 1.2 to 3 mm and in particular from 1.4 to 2 mm.

This semi-finished fiber composite product can subsequently be pressed onto or molded into a semi-finished metal product by way of thermoplastic pressing. Under the influence of pressure and temperature, a covalent chemical bond between the additive-enhanced polyamide and the metal surface is formed during pressing.

Finally, a further aspect of the present invention is directed towards a method of producing such a semi-finished fiber composite product. The method comprises the following steps:

a) providing the polymer composition in accordance with the present invention;
b) producing a film of the polymer composition; and
c) processing the film as part of the manufacturing process of the semi-finished fiber composite product by way of the film-stacking process or the direct melt process or by laminating.

In principle, it is also conceivable to apply the polymer composition in accordance with the present invention directly to a pre-manufactured blank of the semi-finished fiber composite product, for example by way of a modified injection molding process. However, a manufacturing variant that is particularly efficient from an ergonomic perspective provides that initially a film is made of the polymer composition in accordance with the present invention (step b). For this purpose, methods of film production known in the art can be resorted to, such as the film molding process (for example, the casting process) or the film blowing process. Preferably, the film has a thickness ranging from 10 to 600 μm, more preferably from 30 to 300 μm and particularly preferably from 50 to 150 μm. The polymer composition in accordance with the present invention is extremely well-suited for film production.

In step c) of the method, the film is further processed into the semi-finished fiber composite product. According to one variant, the film can be applied directly to a blank of the semi-finished fiber composite product by way of laminating. Particularly preferred, however, is the processing of the film using the so-called film-stacking process and direct melt process. If the film-stacking process is utilized, stacked panels of fiber material and polymeric matrix material are continuously fed into a heated tool, the so-called impregnation unit, where they are thermally melted together. At least one of the two outer panels is a film made of the polymer composition in accordance with the present invention. In the so-called direct melt process, as well, at least one of the outer panels is a film made of the polymer composition in accordance with the present invention. In this process variant, the polymeric polyamide matrix, which surrounds the fibers once the process is completed, is directly fed into the tempered tool of the impregnation unit as a melt.

The processing of the film in the manufacturing process of the semi-finished fiber composite product is preferably carried out by laminating.

In order to finalize the manufacture of the semi-finished fiber composite product, other partial processing steps are performed subsequently, if necessary, such as fabricating, optionally preforming and similar steps. The finalized semi-finished fiber composite product is then used for producing a plastic-metal hybrid component. The metallic base body of such a hybrid component is joined to the semi-finished fiber composite product through substance-to-substance bonding with the help of the adhesion-promoting additive.

A further aspect of the present invention relates to a semi-finished fiber composite product that can be obtained in accordance with the method described above.

Other preferred embodiments of the invention are derived from the additional features mentioned in the subclaims and from the following description.

BRIEF DESCRIPTION OF THE DRAWINGS

In the following, the invention will be explained in detail using some embodiments and the accompanying drawings. The figures show.

DETAILED DESCRIPTION OF THE INVENTION

Figure 1:
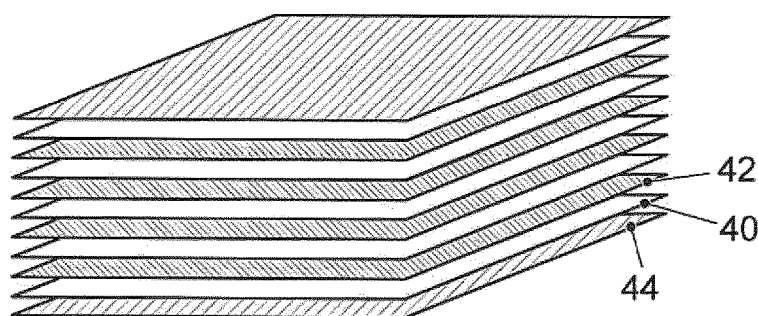
FIG. 1 a schematic view of the design of a semi-finished fiber composite product manufactured by way of the film-stacking process.

The polymer compositions in accordance with the present invention, the films in accordance with the present invention which contain the polymer compositions in accordance with the present invention, the semi-finished fiber composite products in accordance with the present invention which contain the polymer compositions in accordance with the present invention and the method in accordance with the present invention of producing the semi-finished fiber composite product will be described below by way of examples. Where ranges, general formulae or classes of compounds are indicated below, they shall encompass not just the respective ranges or groups of compounds that are explicitly mentioned but also all sub-ranges and sub-groups of compounds which are obtainable by extraction of individual values (ranges) or compounds. Where documents are cited in the context of the present description, their content shall fully form part of the disclosure content of the present invention. Where % figures are given below, these are figures in % by weight, unless otherwise specified. In the case of compositions, the % figures refer to the overall composition, unless otherwise specified. Where average values are indicated below, these are mass averages (weight averages), unless otherwise specified. Where measurement values are indicated below, these measurement values were determined under a pressure of 101325 Pa and at a temperature of 25° C., unless otherwise specified.

General Instructions for Producing the Polymer Composition

In an extruder, adhesion-promoting additives of Formula (I)

$$M_a M'_b D_c D'_d \quad (I)$$

with $M = [R_3 SiO_{1/2}]$
$M' = [R'R_2 SiO_{1/2}]$
$D = [R_2 SiO_{2/2}]$
$D' = [R'R SiO_{2/2}]$ wherein each R stands for methyl and R' is a glycidyloxypropyl radical of Formula (II)

have been either added directly to polyamides (polyamide 6 or polyamide 6,6) by liquid dosing or supplied as masterbatch in solid form.

In the case of liquid dosing (as provided for example by the Dutch company Movacolor), the additives have been mixed in homogeneously in the first third of the extrusion line (0.1 to 20% by weight in relation to the total weight of the polymer composition). For high viscosity additives, a pump with a heatable inlet pipe and a heatable feed vessel was used as an alternative.

Alternatively, 50% masterbatches of the additives in polyamide were produced. Using a separate feeder, the masterbatches were dosed into the main feed throat of the extrusion line, where also the respective polyamide was fed in.

TABLE 1

Additives of Formula (I) that were used

|  | a | b | c | d |
|---|---|---|---|---|
| OMS 1 | 0 | 2 | 18 | 0 |
| OMS 2 | 2 | 0 | 89 | 7 |
| OMS 3 | 2 | 0 | 43 | 5 |
| OMS 4 | 2 | 0 | 73 | 25 |
| OMS 5 | 0 | 2 | 16 | 2 |

The temperature profile in the extruder corresponded to the recommendations by the manufacturer of the respective polyamide. Optionally, the polyamides were pre-dried if their moisture content was above 0.1% by weight. The polymer compositions were processed at a machine output of 3 to 10 kg per hour in dependence on the filling level and the polymer.

Testing the Polymer Compositions in Accordance with the Present Invention

The quality of the distribution of the additives used in the polyamides was assessed directly using the appearance of the strand on its discharge from the extruder head. A homogeneous distribution of the additive in the polyamide was assumed if a homogeneous strand was formed without bubbles, without strand rupture and without a strand thickness variation by more than 20%. This state was designated as "OK" in the embodiments mentioned below.

TABLE 2

Polymer composition based on polyamide 6 (PA6) and polyamide 6,6 (PA6,6)

| Composition | 0.1% | 0.5% | 1% | 2% | 4% | 10% | 20% |
|---|---|---|---|---|---|---|---|
| PA6/OMS 1 | OK | OK | OK | OK | OK | OK | OK |
| PA6/OMS 2 | OK | OK | OK | OK | OK | OK | OK |
| PA6/OMS 3 |  | OK |  | OK | OK | OK |  |
| PA6/OMS 4 |  | OK |  | OK | OK | OK |  |
| PA6/OMS 5 |  | OK |  | OK | OK | OK |  |

| Composition | 2% | 4% | 6% | 8% | 10% |
|---|---|---|---|---|---|
| PA6/OMS MB 1 | OK | OK | OK | OK | OK |
| PA6/OMS MB 2 | OK | OK | OK | OK | OK |
| PA6/OMS MB 3 |  | OK |  | OK |  |
| PA6/OMS MB 4 |  | OK |  | OK |  |
| PA6/OMS MB 5 |  | OK |  | OK |  |

| Composition | 0.5% | 1% | 2% | 4% | 10% |
|---|---|---|---|---|---|
| PA6,6/OMS 1 | OK | OK | OK | OK | OK |
| PA6,6/OMS 2 | OK | OK | OK | OK | OK |

MB means dosing as masterbatch, no additional specification means dosing via liquid dosing; not specified means that these compositions were not produced. All polymer compositions that were made fulfilled all quality criteria specified above.

Film Production

The films were produced in a casting process as so-called cast films with a layer thickness of 50 to 600 µm (cast film line built by the Collin company). The quality of the films was assessed by measuring and comparing the layer thickness in different regions of the film, with a layer thickness variation of less than 15% being designated as OK in the application examples shown below.

The thickness was determined by using a digital outside micrometer of the Mitutoyo company with a clamping force of 7 to 9 Newton to determine the thickness of the film at 5 arbitrarily and randomly selected points of a sample measuring 30 cm by 30 cm from the center of the material.

It is not required for the resulting film made of the polymer composition to be transparent; rather, it can also have an opaque appearance.

TABLE 3

Films - polymer composition and layer thickness

| Polymer composition | Film layer thickness in µm | | | | | |
|---|---|---|---|---|---|---|
|  | 50 | 100 | 150 | 250 | 400 | 600 |
| PA6/0.5% OMS 1 | OK | OK | OK | OK | OK |  |
| PA6/2% OMS 1 | OK | OK | OK | OK | OK | OK |
| PA6/4% OMS 1 | OK | OK | OK | OK | OK |  |
| PA6/10% OMS 1 | OK | OK | OK | OK |  |  |
| PA6/0.5% OMS 2 | OK | OK | OK | OK | OK | OK |
| PA6/2% OMS 2 | OK | OK | OK | OK | OK | OK |
| PA6/4% OMS 2 | OK | OK | OK | OK | OK |  |
| PA6/10% OMS 2 | OK | OK | OK | OK | OK |  |
| PA6/2% OMS MB 2 | OK | OK | OK | OK | OK | OK |
| PA6/4% OMS MB 2 | OK | OK | OK | OK |  |  |

If no values are given, the respective films were not produced. It is apparent that all films that were made fulfilled the quality criteria specified above.

Producing a Semi-Finished Fiber Composite Product Based on a Film

The films that were made were further processed into semi-finished fiber composite products by way of the film-stacking process or the direct melt process. FIG. 1 provides a schematic illustration of the structure of the semi-finished fiber composite product when using the film-stacking process and FIG. 2 when using the direct melt process.

The design of the installation technology for performing both of these processes is sufficiently well known and comprises units for material feeding, an interval pressing unit with impregnation and compositing lines and, arranged downstream, a roll mill and a fabricating unit. The material feed includes roll holders for the individual polyamide films and semi-finished textile products, such as woven or non-woven fabrics, utilized in the respective processes. In the case of the direct melt process, a separate plastication unit for direct impregnation with polymer melts is present. The impregnation and compositing line in which the fed films, semi-finished textile products and, if applicable, melts are combined is predetermined by the interval pressing unit. Such installations are sufficiently well known, see for example the publications of the Neue Materialien Fürth GmbH company.

FIG. 1 shows an exemplary sequence of alternating layers of various materials such as can be used in producing a semi-finished fiber composite product by way of the film-stacking process. According to this embodiment, the matrix material is provided by feeding a total of five matrix films 40 into the interval pressing unit. Each matrix film 40 consists of polyamide, in particular polyamide 6. Four layers of a semi-finished reinforcement product 42 are arranged alternatingly between the matrix films 40. The semi-finished reinforcement product 42 includes the fibers serving as reinforcement. Possible fiber types for this purpose are, for example, glass fibers, carbon fibers or aramid fibers. Possible types of semi-finished reinforcement products comprise woven and non-woven fabrics. Finally, a modified peripheral film 44 made of the polymer composition in accordance with the present invention is provided in each of the peripheral regions of the layer stack shown.

Figure 2:
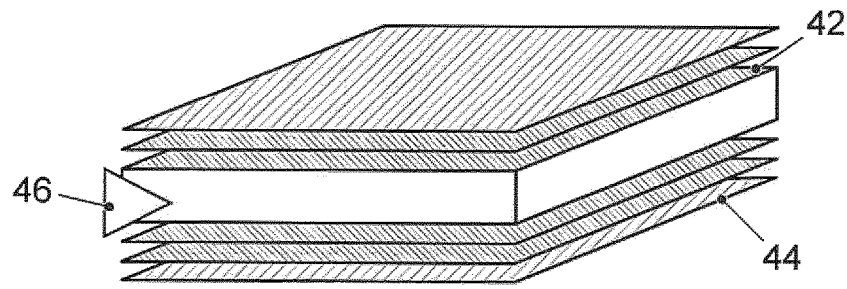
FIG. 2 a schematic view of the design of a semi-finished fiber composite product manufactured by way of the direct melt process.
Figure 3:
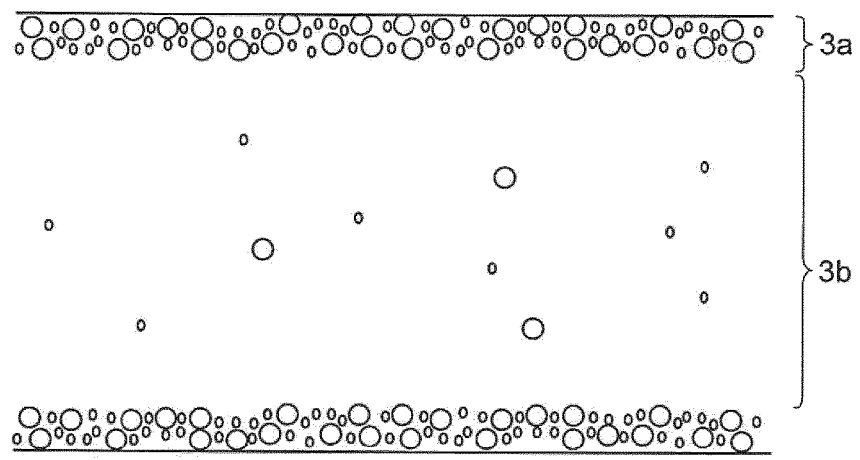
FIG. 3 a schematic view of the distribution of the adhesion-promoting additive over the cross-section of a film in accordance with the present invention.
Figure 4:
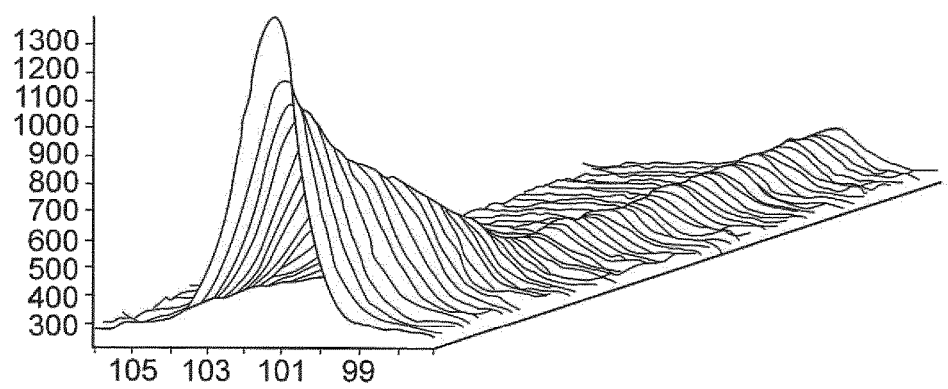
FIG. 4 an XMS measurement of a film for determining the silicon concentration as a function of the distance to the surface. Each line corresponds to a depth increasing by 0.2 nm; the highest concentration was found in the surface.

When using the direct melt process, layers of a semi-finished reinforcement product 42 and a modified peripheral film 44 are fed into the interval pressing unit, as well, in the sequence illustrated in FIG. 2. In addition, a polymer melt 46 consisting of polyamide, in particular polyamide 6, is fed in by way of a plastication unit.

The structure illustrated in FIGS. 1 and 2, in particular the sequence of layers and the number of layers of the semi-finished reinforcement product 42 and the matrix film 40, is variable and can be adapted to the respective requirements. Of importance for the purpose of the invention is only that a modification of the peripheral layers on one side or both sides of the semi-finished fiber composite product is performed by laminating with the modified peripheral film 44 made of the polymer composition in accordance with the present invention.

Manufacturing Process of a Semi-Finished Fiber Composite Product without Film Production A further method of producing a semi-finished fiber composite product with modified peripheral layers without prior film production is provided by the double-belt pressing process. In this process, one or more layers of a dry (not impregnated) endless fiber-reinforced semi-finished fiber composite product are drawn into a double-belt press. Just as in the direct melt process, the matrix material is applied to the dry fabric, preferably through a flat-sheet die, in the triangular space between the individual layers.

The invention claimed is:

1. A polymer composition, containing
   a) 100 parts by weight of a polyamide;
   b) 0.5 to 20 parts by weight of one or more adhesion-promoting additives of Formula (I):

$$M_a M'_b D_c D'_d \quad (I)$$

with
   $M=[R_3SiO_{1/2}]$
   $M'=[R'R_2SiO_{1/2}]$
   $D=[R_2SiO_{2/2}]$
   $D'=[R'RSiO_{2/2}]$
   wherein each R independently stands for methyl or phenyl,
   wherein R' is a glycidyloxypropyl radical of Formula (II)

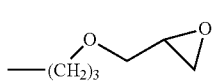

(II)

wherein the following holds true for the indices:
   a=0 to 2,
   b=0 to 2,
   c=15 to 100,
   d=0 to 50,
   a+b=2, and
   b+d≥2,
   wherein a ratio (a+c)/(b+d) of the sum of the indices a +c to the sum of the indices b +d ranges from 4 to 20,
   wherein the composition includes at least 90% by weight of the mixture of polyamide with the adhesion-promoting additive of Formula (I), and
   wherein the adhesion-promoting additive of Formula (I) does not react with the polyamide.

2. The polymer composition of claim 1, wherein R stands for methyl.

3. The polymer composition of claim 1, wherein a ratio (a+c)/(b+d) of the sum of the indices a+c to the sum of the indices b+d ranges from 2 to 50.

4. The polymer composition of claim 1, wherein it holds true for index c that: c=15 to 100.

5. The polymer composition of claim 1, wherein
   (i) in the case that b=2, it holds true for index d that: d=0 to 20; and
   (ii) in the case that b=0, it holds true for index d that: d=2 to 20.

6. The polymer composition of claim 1, wherein the polymer composition contains 0.5 to 5 parts by weight of the adhesion-promoting additive.

7. The polymer composition of claim 1, wherein the polyamide is selected from the group comprising polyamide 6, polyamide 12 and polyamide 6,6.

8. The polymer composition of claim 7, wherein the polyamide is polyamide 6.

9. A semi-finished fiber composite product based on polyamide, wherein at least a part of the surface of the semi-finished product is formed from a polymer composition according to claim 1.

10. A film containing a polymer composition of claim 1, wherein the film is between 10 μm and 600 μm in thickness.

11. The film of claim 10, wherein both sides of the film have at its boundary layer a zone in which the adhesion-promoting additive of Formula (I) is accumulated.

12. A method of producing a semi-finished fiber composite product, the method comprising the steps of:
    a) providing a polymer composition of claim 1;
    b) producing a film of the polymer composition; and
    c) processing the film as part of the manufacturing process of the semi-finished fiber composite product by way of the film-stacking process or the direct melt process or by laminating.

13. A semi-finished fiber composite product obtainable by the method of claim 12.

14. The polymer composition of claim 3, wherein the ratio ranges from 4 to 20.

15. The polymer composition of claim 3, wherein the ratio ranges from 5 to 15.

16. The polymer composition of claim 4, wherein it holds true for index c that: c=20 to 50.

17. The polymer composition of claim 5, wherein in the case that b=2, it holds true for index d that: d=1 to 10.

18. The polymer composition of claim 5, wherein in the case that b=0, it holds true for index d that: d=3 to 10.

* * * * *